(12) United States Patent
Perumal et al.

(10) Patent No.: US 9,386,106 B1
(45) Date of Patent: Jul. 5, 2016

(54) COMMUNITY-BASED DETECTION OF A MISSING DEVICE

(71) Applicant: Symantec Corporation, Mountain View, CA (US)

(72) Inventors: Vijay Bhaskar Perumal, Los Angeles, CA (US); Charles A. Payne, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 34 days.

(21) Appl. No.: 14/106,557

(22) Filed: Dec. 13, 2013

(51) Int. Cl.
*G06F 21/88* (2013.01)
*H04L 29/08* (2006.01)

(52) U.S. Cl.
CPC ............... *H04L 67/18* (2013.01); *G06F 21/88* (2013.01)

(58) Field of Classification Search
CPC ....................................................... G06F 21/88
USPC ....................................................... 726/34, 35
See application file for complete search history.

(56) References Cited

U.S. PATENT DOCUMENTS

| 5,875,400 | A | * | 2/1999 | Madhavapeddy et al. ..... 455/458 |
| 8,402,134 | B1 | | 3/2013 | Hir |
| 2011/0044264 | A1 | * | 2/2011 | Chen ................... H04W 36/245 370/329 |
| 2012/0315902 | A1 | * | 12/2012 | Nakahama et al. ........ 455/435.1 |

OTHER PUBLICATIONS

Tile, Inc., The Tile App, obtained from https://www.thetileapp.com/?utm_source=AdWords&utm_medium=CPC, available as early as Aug. 2013.
Apple Inc., If your iPhone, iPad, or iPod touch is lost or stolen, available from http://support.apple.com/kb/HT5668 as early as Aug. 2013.
AT&T, Replace your lost or stolen device and suspend service, available from http://www.att.com/esupport/article.jsp?sid=kb63935&cv=820#fbid=hX9FWKKWEni, as early as Aug. 2013.
2X, Find a Lost Mobile Device, available from http://www.mobiledevicemanager.com/mobile-device-security/find-lost-mobile-devices/, Sep. 19, 2011.

* cited by examiner

*Primary Examiner* — Alexander Lagor
(74) *Attorney, Agent, or Firm* — Holland & Hart LLP

(57) ABSTRACT

A computer-implemented method of community detection of a missing device is described. The method includes receiving a missing device report having identifying information of a missing device, sending a search command to an agent including the missing device report, and receiving a search report from the agent comprising whether or not the identifying information of the missing device is detected in a network to which the agent is connected. Also a method of community detection of a missing device through receiving a search command having identifying information of a missing device is described. The method includes monitoring network activity of a network for the identifying information of the missing device connected to the network, and sending a search report comprising whether or not the identifying information of the missing device is detected in the network.

15 Claims, 9 Drawing Sheets

COMMUNITY-BASED DETECTION OF A MISSING DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Computing systems may be mobile so that users may carry these systems as they travel, shop, work, etc. The highly portable nature of many mobile computing systems makes them easy to carry and use wherever users go, but this can also make them more vulnerable to theft. To guard against theft, many software solutions have been proposed, wherein when the computing devices are reported as being stolen, a security software administrator connects to the device and attempts to retrieve valuable information, erase valuable information, or collect information of the whereabouts of the computing devices to attempt to locate and recover them. However, savvy thieves may be able to detect and disable or erase the security software, rendering the software ineffective. Many devices do not have embedded anti-theft chipsets, so sometimes the only way to identify and reclaim stolen devices is through law enforcement catching the thief and properly identifying the stolen property. Too frequently, however, the device is never recovered.

SUMMARY

According to at least one embodiment, a method of community-based detection of a missing device is provided. The method may comprise receiving a missing device report, the missing device report comprising identifying information of the missing device; sending a search command to an agent, the search command including the missing device report; and receiving a search report from the agent, the search report comprising whether or not the identifying information of the missing device is detected in a network in which the agent is connected.

In some arrangements, the identifying information comprises permanent identifying information of the missing device. The permanent information may comprise multiple pieces of data, such as multiple identifying numbers or other elements. The missing device report may comprise a location, and identifying an agent to which to send the search command may be based on the location. The location may be a last known location of the missing device.

In some cases the missing device report may further comprise a time, and identifying an agent to which to send the search command may further comprise identifying an agent within a geographic region based on a difference between the time of the missing device report and a time of sending the search command. The time may be an at least estimated time of loss of the missing device.

In some embodiments the search report may comprise a geographic location of the agent. Thus, the method may further comprise producing a detection alert that identifies the geographic location of an agent detecting the identifying information of the missing device.

The search command may be sent to a plurality of agents, and a plurality of search reports may be received from the plurality of agents. Each of the plurality of search reports may comprise a geographic location of the agents sending the search reports and a time of detection of the identifying information of the missing device. In such cases, the method may further comprise estimating a location of the missing device based on the geographic locations of the agents and the times of detection of the identifying information of the missing device.

In another exemplary embodiment, a method of community-based detection of a missing device may be implemented, with the method comprising receiving a search command comprising identifying information of the missing device; monitoring network activity of a network for the identifying information of the missing device connected to the network; and sending a search report comprising whether or not the identifying information of the missing device is detected in the network.

The identifying information may comprise permanent identifying information of the missing device. The search report may further comprise a geographic location, such as, for example, a global positioning system (GPS) location.

Monitoring network activity of the network may comprise accessing a network device that receives identifying information of the missing device. A network device may be a router, another agent, or other network node receiving information from devices on the network. Monitoring network activity of the network may also comprise searching for the identifying information in at least one of: a connected IP range of the network, a network domain, a parent network domain, a DHCP client table of the network, DNS entries of the network, or network traffic of the network. The search report may comprise identifying information of all devices encountered on the network.

In another embodiment, a computing device may be configured to detect a missing device using community-based networking. The computing device may comprise a processor and a memory in electronic communication with the processor. The memory may store instructions that, when executed by the processor, cause the computing device to: receive a missing device report comprising identifying information of the missing device; send a search command to an agent, wherein the search command includes the missing device report; and receive a search report from the agent, wherein the search report comprises whether or not the identifying information of the missing device is detected in a network in which the agent is connected.

This computing device may have a missing device report further comprising a location, and the computing device may be instructed to identify an agent to which to send the search command based on the location. The search report may comprise a geographic location of the agent. The computing device may receive a plurality of search reports and a plurality of geographic locations. In such cases the instructions of the computing device may further cause the computing device to estimate a location of the missing device based on the plurality of geographic locations. The search command may comprise encrypted identifying information of the missing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
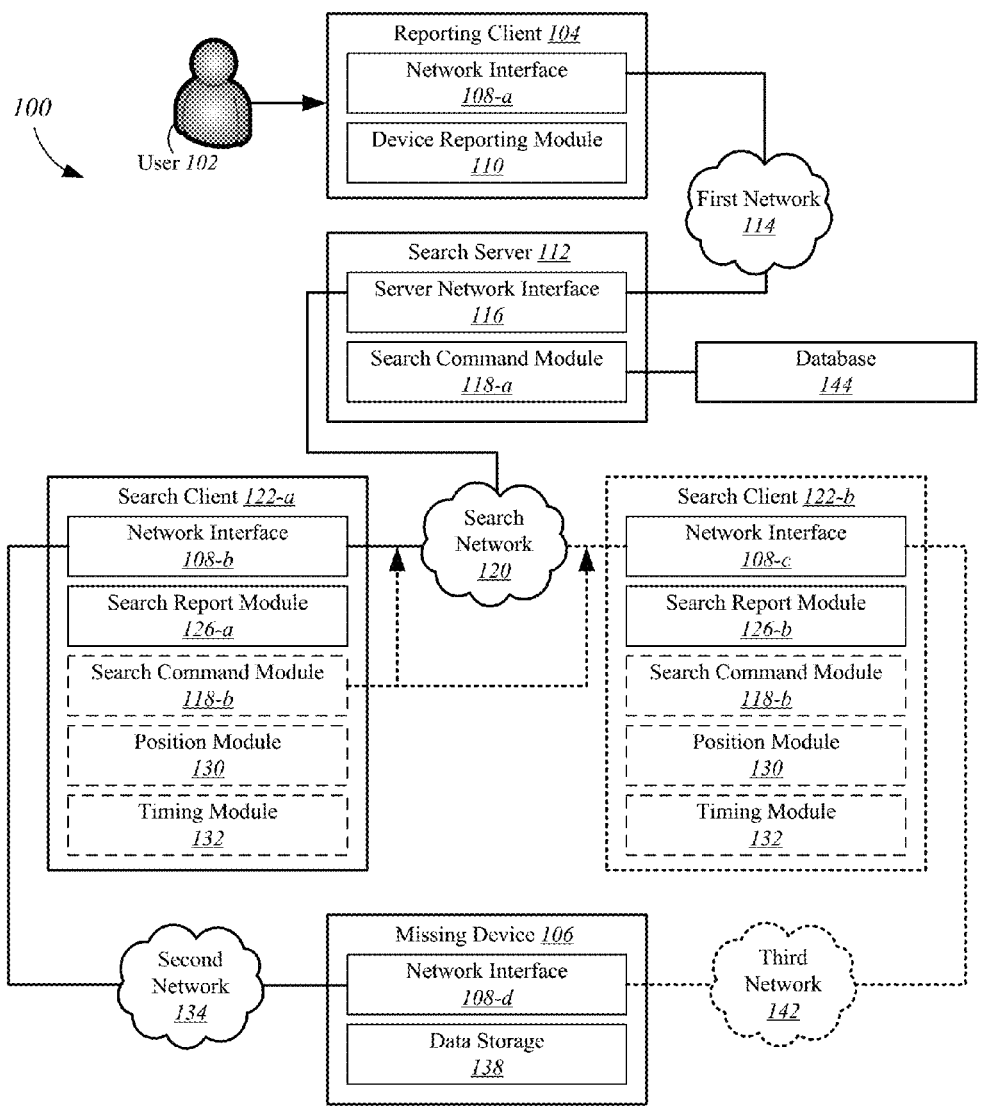
FIG. 1 is a block diagram illustrating a system in which embodiments of the present disclosure may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

According to some embodiments of the present disclosure, systems and methods of community-based detection of a missing device are provided. In many cases security or anti-theft software or hardware installed on a computing device that goes missing may be uninstalled or disabled by thieves. Therefore, a community-based detection solution may allow the owner of a missing device to find and recover it using software or hardware installed on other devices in a community or network to which the thief connects the missing device. These other devices may detect information identifying the missing device and help locate its whereabouts. For example, the other devices in a network to which the missing device is connected may discover the missing device and thereby establish at least a general area in which the missing device may be found based on the reach of the network. Even if the missing device has anti-theft software that is disabled or uninstalled, other devices in the network may still be able to identify the missing device based on permanent identifying information that is readable by a network administrator. Thus, a thief may be unable to avoid detection by removing security software from the device. The network administrator may also take affirmative measures to deny or disable features of the missing device, such as its connectivity to the network, until it is recovered by its owner.

Community-based systems may be advantageous because thieves are unable to disable security software on all devices in a network to which the missing device connects. Many identifiers of a missing device may appear to a network peer or administrator (e.g., a media access control (MAC) address), so, in effect, a "community watch" system may be created that may detect the missing device by these identifiers even if security software or other identifying data is disabled or removed.

According to one embodiment, when a device is lost or stolen, a registered user may submit a report to a search server including relevant information about the missing device, including identifying information, and the search server may then issue commands to search clients to attempt discovery of the missing device on networks to which the search clients are connected. Upon detection of the missing device on one of these networks, the search client may report the detection along with any other information known about the missing device (e.g., an estimated location), which can then be forwarded to the registered user, law enforcement, or another party to assist in recovery of the missing device.

While disclosure has been made herein primarily to detection and recovery of devices that are stolen, it will be appreciated that the present systems and methods are sufficiently adaptable to be implemented for detection and recovery of devices that are unintentionally missing (e.g., lost) or difficult to find. Thus, while the present disclosure relates generally to theft recovery, "security software" or "security systems" as used herein may refer to systems and methods for identifying and locating any arbitrary device in a network of system-enabled devices, no matter the circumstances surrounding its loss or disappearance.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Turning now to the figures, FIG. 1 is a block diagram illustrating a system 100 in which embodiments of the present disclosure may be implemented. When a device goes missing, a user 102 may access a reporting client 104 to make a report regarding a missing device 106. The reporting client 104 may comprise a network interface 108-*a* and a device reporting module 110. The network interface 108 may connect the reporting client 104 to a search server 112 via a first network 114. The search server 112 may include a server network interface 116 and a search command module 118-*a*. The server network interface 116 may connect the server 112 to a search network 120 linked to one or more search clients 122-*a* and 122-*b*. The search client 122-*a* may connect to the search network 120 via a network interface 108-*b*. The search client 122-*a* may also comprise a search report module 126-*a*, and, in some embodiments, a search command module 118-*b*, position module 130, and/or timing module 132. The client network interface 108-*b* may be connected to a second network 134, which may be connected to a network interface 108-*d* of the missing device 106. The missing device 106 may also comprise data storage 138. These elements will be discussed now in further detail.

The user 102 may be a person or entity with which the missing device 106 may be registered or associated. For example, the user 102 may be an owner or administrator of the missing device 106 or a law enforcement official searching for it. The identity of the user 102 may be verified and/or stored as part of the system (e.g., by the search server 112 or reporting client 104).

The reporting client 104 may be a "computing device" such as a computer, computer terminal, server, mobile device, smartphone, laptop, tablet, or other similar computer interface or device enabled for execution of logic. The reporting client 104 may be accessible by the user 102, such as being a computing device of the user 102 other than the missing device 106. The reporting client 104 may include a network interface 108-*a* allowing the reporting client 104 to access the search server 112. Thus, in some embodiments the user 102 may log on to the central search server 112 directly to input information, and the device reporting module 110 may be located at the search server 112.

The missing device 106 may be associated with the user 102. The missing device may have an unknown location, but may have identifying information stored in data storage 138 or otherwise embedded on the missing device 106. The missing device may have network connectivity via network interface 108-*d*, and the identifying information may be transmitted, actively or passively, through the network interface 108-*d* to the second network 134 of connected devices, such as, for example, a router, modem, or other network access point.

The network interfaces 108 and 116 may comprise one or more known network interface. Each network interface 108, 116 may include capability for connection to multiple networks or make network communications via multiple network configurations or standards. For example, a network interface 108, 116, may comprise a wired or wireless communication connection, such as an Ethernet or Wi-fi link to one or more network 114, 120, 134, 142. Network interfaces 108, 116, may connect to a cellular network, radio network, local network or other link enabling electronic communication between devices 104, 112, 122, 106 of the system 100. Thus, network interfaces 108, 116, may include chips, wires, ports, and/or antennas. In some embodiments, the network interface may be a two-way connection between devices, enabling both sending and receiving electronic communications.

The device reporting module 110 may comprise a software or hardware interface by which a user 102 may interact with the reporting client 104 to report a missing device and receive information from the search server 112. The device reporting module 110 may comprise software installed on memory of the reporting client 104 computing device and executed by a processor. The device reporting module 110 may be configured to receive information about the missing device 106. For example, the device reporting module 110 may receive identifying information about the missing device 106, such as its network-identifiable device name, MAC address, serial number, International Mobile Station Equipment Identity (IMEI number), and/or other uniquely-identifying information about the missing device 106 that may be used to detect the missing device 106 upon its connection to a network (e.g., second network 134) or used to identify the missing device 106 upon its physical discovery. The device reporting module 110 may further include capability to receive additional information from the user 102, such as, for example, the user's identity, registration number, an at least approximated time that the missing device 106 went missing, and/or an at least approximated location (e.g., geographical coordinates or a physical address) at which the missing device 106 was last seen. In some cases, the user 102 may also input address information for multiple connection standards, such as, for example, a MAC address for LAN, Wi-Fi, and Bluetooth® network connectivity for the same device. Information gathered by the reporting client 104 (e.g., via the device reporting module 110) may be transmitted to the search server 112 via network interface 108 and first network 114.

In some embodiments, the user 102 may register the missing device 106 (preferably before it is missing) by running a specialized software program on the missing device which can automatically retrieve and store the device's uniquely identifiable information in a central server (e.g., reporting client 104 or search server 112). Thus, the requisite information can be recorded with minimal user interaction prior to its disappearance, thereby improving the reliability of the data being completely and correctly entered by the user 102.

The search server 112 may be a computing device (as described above in connection with the reporting client 104) that is specifically suited for the purpose of receiving information from the reporting client 104 and search clients 122, and transmitting information to the clients 104, 122. The search server 112 may be remotely located from the user 102, clients 104, 122, and the missing device 106. The search server 112 may be configured to receive information via network interface 116 and process the information using a search command module 118-*a*. Instructions and other information may then be transmitted, again via network interface 116, to first network 114 or a search network 120 from the search server 112.

First network 114 may comprise any known networks used for connection of computing devices. For example, the first network 114 may include a local area network (LAN) (e.g., an intranet) or wide area network (WAN) (e.g., the Internet). The first network 114 may comprise hubs, access points, and other nodes linking devices 104 and 112 to each other, such as routers, relay electronics, internet service provider (ISP) equipment, antennas, base stations, and the like, as will be apparent to those skilled in computer networking and telecommunications. Thus, first network 114 is illustrated as a cloud shape to describe its amorphous structure and to provide for the inclusion of many network nodes and elements between the reporting client 104 and search server 112.

The search network 120, second network 134, and third network 142 may be similarly configured to provide amorphous communications between the search server 112 and clients 122, or between the clients 122, and the missing device 106. These networks 120, 134, 142 may also comprise the network types discussed in connection with first network 114. The networks 114, 120, 134, 142 may be interacted with via network interfaces 108, 116, described above. Communications over the network interfaces 108, 116, may be encrypted to preserve privacy of the data being transmitted.

A search command module 118-*a* may be located at the search server 112. The search command module 118-*a* may comprise a software or hardware interface by which the search server 112 may interact with the reporting client 104 or other clients 122, to report and receive information. The search command module 118-*a* may comprise software instructions installed on memory of the search server 112 and executed by a processor of the search server 112.

The search command module 118-*a* may be configured to receive information about the missing device 106 and, potentially, the circumstances of its disappearance from the reporting client 104 (e.g., as input by the user to the device reporting module 110). The search command module 118-*a* may then form a set of information or a "package" to be delivered to all computers or other devices (e.g., clients 122) in the search network 120. The package may be encrypted before transmission. The package may include the identifying information about the device (e.g., MAC address, name of device, etc.) and a software command script with instructions for the search clients 122 to run using a search report module 126-*a*. The content of these instructions may be set forth in further detail in connection with FIGS. 4A-4B, infra.

The package prepared by the search command module 118-*a* may be sent to clients in the search network 120. In some arrangements, all clients in a search network 120 may be issued the package. In some embodiments, the package is sent to clients based on geographical and/or chronological information received from the user 102 concerning the circumstances of the disappearance of the missing device 106. For example, the package may be sent to clients in the search network 120 that are within a time-based geographic radius from the location where the device went missing. The radius may be defined by the difference in time between the time of loss of the device to the time that the search clients in the search network 120 execute the instructions in the package using a search report module 126-*a*. For example, if a device is lost in one city, the radius may be defined by the distance that a thief carrying the device could have reasonably traveled from that city in the time between the time of loss and the time that the instructions of the package are executed by the clients in search network 120. If the thief is expected to be able to travel by car on a highway, a radius of approximately 75 or 80 miles per hour of missing time may be the radius used for identifying clients in the search network 120 to which to send the package. By defining this radius and only sending the package to clients in the search network 120 in the area within the radius, system resources may be preserved and the search for the missing device 106 may be performed more expeditiously and by clients in the network 120 that are most likely to detect the missing device 106. Additionally, sensitive information about the missing device 106 is sent to fewer locations as a form of loss prevention (i.e., reduction of risk) in case the information is decrypted or otherwise intercepted while the clients 122 search for the missing device 106. In some embodiments, the "radius" of the search may define a non-circular boundary (e.g., ellipse, square, or arbitrary shape).

After sending the package to the appropriate clients in the search network 120, the search command module 118-*a* may wait to receive a response from the search clients 122. In this time, the search command module 118-*a* may modify the number or type of clients to which the package is sent. For example, if a detection of the missing device 106 is not received within a predetermined period of time, the search command module 118-*a* may broaden the search to include more clients in the search network 120 or otherwise alter the scope of the search (e.g., to include more types of networks such as expanding from a LAN-based search to a cellular-based search as well).

Search network 120 may include the features discussed above. The search network 120 may refer to a network connecting the search server 112 to a plurality of search clients 122. Clients 122 on the search network may be required to pre-register or install software to become incorporated with the search network 120.

Search client 122-*a* may be a computing device as set forth above. Its network interface 108-*b* may connect to the search network 120 to interface with the search server 112 or other search clients (e.g., search client 122-*b*). The search client 122-*a* may be configured to receive information about other devices in a network (e.g., second network 134). The search client may be part of a "community" network of computing devices or agents. User equipments (UEs) may join the community network by installing a client agent program. The program may have capability to run as a service in the background of the UE's operation. The program may be able to search for a device by executing a script (e.g., from a package from search command module 118-*a*). The program may further be able to send and receive packages that have commands, code script, and results. It may also have authority on the UE to send "heart beat" pings to a central server (e.g., search server 112) to indicate whether the program and/or device of the client 122 is online or offline. Where appropriate, the program may also periodically send its physical location either by sending, via a secure channel, the geographical coordinates of the UE or by sending the MAC address of a router to which the UE is connected. The program may beneficially be installed on many different platforms and products, such as, for example, Apple iOS® devices, Google Android® devices, and personal computers (e.g., using Linux, MAC OS X®, or Microsoft Windows®) to broaden the number of nodes in the search network 120 and improve the capability of the search network 120 to extend to a client 122-*b* that will be connected to a third network 142 having the missing device 106. In some embodiments, the software program component may be installed as part of anti-virus or anti-theft software, safe search toolbars, identity theft protection tools, and as standalone device recovery software. The software program may require authorization by a user 102 to operate, or may work passively (e.g., after acceptance by a user in an end user license agreement (EULA) that allows the program to ping other computers and connect to a search server 112 autonomously). Some of these programs may also log information about the location of a missing device 106 before it goes missing, and that information may be used as a starting point to determine where to begin a search or to determine which search clients should be instructed by the search command module 118-*a*.

Search report module 126-*a* may be located at a search client 122. The search report module 126-*a* may comprise a software or hardware interface by which the search client 122 may interact with the search network 120 and search server 112 or second network 134 and missing device 106 to report and receive information. The search report module 126-*a* may comprise software instructions installed on memory of the search client 122 and executed by a processor of the search client 122. The software instructions of the search report module 126-*a* may include a component to receive a package from the search sever 112 prepared by the search command module 118-*a*. The software instructions may comprise instructions set forth in further detail in connection with FIG. 5, infra. The package may be encrypted, and the search report module 126-*a* may decrypt it and then run a script contained therein. For example, the MAC address of the missing device 106 may be hashed when sent to the clients in a search network 120, thereby masking identifying information.

The instructions of the search report module 126-*a* may include a specified schedule, such as a repeating instruction or directions to perform the instructions at a specified time or location. The software instructions may cause the search report module 126-a to search for the missing device 106 in under certain parameters (e.g., a connected IP range, a network domain, and/or a parent network domain). In some embodiments, the search report module 126-a is installed on a router for a search client 122 (or where the search client 122 is a router) and the software may check a dynamic host configuration protocol (DHCP) client table, domain name system (DNS) entry list, and inspect network traffic to attempt to detect the presence of the missing device 106 in the second network 134 via the network interface 108.

After making a search, the search report module 126-a may transmit results via the search network 120 to the search server 112 or to another search client (e.g., search client 122-b). The results may include whether or not the missing device 106 has been detected, a MAC address match, a name of the missing device 106 detected by the search report module 126-a, and other identifiable information about the missing device 106. In some embodiments, a position module 130 may also allow the search client 122 to report the geographical position of the search client 122 and a timing module 132 may allow the search client to report a time of detection of the missing device 106 and/or a response time to a ping command sent throughout the network 134, as further discussed in connection with these elements below.

Search command module 118-b may serve similar functions to the search command module 118-a of the search server 112. The search command module 118-b positioned at search client 122-a may indicate that in some embodiments the search clients 122 may act as a repeater for search instructions (e.g., packages) from search command module 118-a. In some embodiments, the search client 122-a may modify or issue search command packets of its own using search command module 118-b, such as by sending instructions to another search client (e.g., via a direct connection to network interface 108-c of search client 122-b or via search network 120), as indicated by dashed connection lines and arrows.

Position module 130 may comprise a device or software program at a search client 122 or accessible by a search client 122 to determine the position of the search client 122. Thus, the position module 130 may comprise an element configured to determine the geographic or network location of the search client 122. For example, the position module 130 may comprise a global positioning system (GPS) receiver that allows the search client 122 to geolocate itself. In another embodiment, the position module 130 may be a software routine to triangulate the position of the search client 122 via radio signals (e.g., Wi-fi or cellular signals) from nearby transceivers. A position module 130 may not be included in all embodiments, but in those embodiments where it is included, it may allow more speedy location and recovery of a missing device 106 since it may allow the user 102 or another authorized individual to locate the position of the search client 122 that discovered the missing device 106 on second network 134. The reach of the second network 134 may then set forth an estimated position of the missing device 106. For example, if second network 134 is a local Wi-fi network, the range of the antenna of the local network may be estimated and provided to give the user 102 an estimated range away from the position module 130 that the missing device 106 was detected. In many cases, this range may be within 50-200 feet of the position module 130, so law enforcement or other individuals may quickly narrow down a search for the missing device 106 to a manageable area where the device 106 is known to have been recently detected.

In embodiments with a timing module 132, the search client 122 may determine the timing of various interactions in the networks 120, 134. For example, the timing module 132 may provide the time at which a missing device 106 is detected or the time at which a ping command or other search for the missing device 106 has been conducted. A timing module 132 may also provide the time between sending a search command from the search client 122 to other devices (e.g., client, networks 120, 134, and missing device 106) and the time to a response from the missing device 106. This timing may help to provide an estimate of the distance at which the missing device 106 may be located, based on known ping timings to other devices comparable to the missing device 106. Using a timing module 132, the search client 122 may be able to detect the missing device 106 at multiple points in time, then gather information about multiple ping timings for each of those detections and establish whether the missing device 106 would be expected to be moving nearer to the client 122 or farther away. With this information, the search command module 118 may more efficiently distribute packages to clients 122 that are expected to be within range of the missing device 106, even while it is in motion, and thereby more quickly lead to the recovery of the missing device 106.

Networks 134, 142 may comprise one or more network that at least one of the search clients 122 and the missing device 106 are connected to. The networks 134, 142 may be wireless local area networks (WLANs), such as common Wi-fi networks (e.g., those following IEEE 801.11 standards), in one or more bands or wireless communication standards. The networks 134, 142 may be direct connections between the clients 122 and the missing device 106, but in some embodiments may comprise additional nodes, such as a router to which both devices 106 and 122 are connected. Therefore, in some embodiments the search client 122 may connect to another node to ascertain the presence of the missing device 106 on the network 134, 142. For example, the search client 122 may have administrator privileges to connect to a router that is part of second network 134 to then be able to search MAC address, DNS entries, and/or DHCP tables received or stored by the router. In this manner, the router would not have to have a search report module 126-a or search command module 118-b installed thereon, and a connected computer may perform the task of the search client 122 separately. In other embodiments, the search client 122 may be the router, and the logs of the router may be accessed upon receiving a package from the search command module 118.

Data storage 138 on the missing device 106 may comprise the MAC address, device name, IMEI, serial number, and other identifying information of the missing device 106. Preferably, the data storage 138 contains at least one identifier that is not changeable by the user, such as a permanent MAC or internet protocol (IP) address of the device. For this reason, the device 106 may be detected even if the thief attempts to disable anti-theft software, or even if the device is entirely reset or data-wiped after being taken from the user 102. The identifying information may comprise multiple pieces of data, such as a MAC address, IMEI, permanent IP address, and other data simultaneously. In some embodiments, the data storage 138 may comprise an electronic storage medium such as a memory or disk of the missing device 106. The data storage 138 may also be a hard-encoded electronic signature of the device 106 that may be discoverable upon the connection of the missing device 106 to a network 134, 142.

In some embodiments, the system 100 includes one search client 122-a, as indicated by the dashed lines of search client 122-b which indicate its optional status. In some embodiments, the system 100 includes a search network 120 that connects to multiple search clients 122. The search clients 122 may be connected to the same network 134 or to multiple networks 134, 142 to which the missing device 106 may also be connected. For example, one search client 122-*a* may connect to a Wi-fi network (e.g., 134) and the other search client 122-*b* may connect to a cellular network (e.g., 142) such as a global system for mobile communications (GSM) network, long term evolution (LTE) network, or comparable telecommunications system. Thus, the search network 120 may include multiple types of networks in which the device 106 may be located. In other embodiments, more than two search clients 122, may be used, and search clients 122 may be connected to the same network (e.g., network 134 alone) or additional networks (e.g., in addition to networks 134, 142).

Upon detection of the missing device 106 on a network connected to a search client, the MAC address or other identifying information of the search client 122 or router gateway, including GPS position and timing module 132 information, if available, is reported back to the search server 112. This transmission may be encrypted by the search report module 126-*a* before sending via a network interface 124 for added security.

The search command module 118-*a* may then receive the results received from various search clients in the search network 120. In some embodiments, the search command module 118-*a* may plot results on a map showing the geographical coordinates of the search clients 122 (and/or routers connected thereto) that report a detection of the missing device 106. Using this information, the search command module 118-*a* may formulate an estimate of the position of the missing device 106. The search command module 118-*a* may also have access to a database 144 that contains mapping for router MAC addresses (or other identifying information) that links this identifying information to a geographical location before showing the results on a map. The map may be provided to the user 102 or sent to the reporting client 104, if necessary, for viewing and retrieval by the user using the device reporting module 110. When multiple search clients 122 detect the missing device 106, the search command module 118-*a* may improve the estimated position of the missing device 106 by using triangulation logic including elements such as ping response time and multiple detections on the same network (e.g., 142) to fine tune the accuracy of the location of the missing device 106 for the user 102. The map or other detection information may be referred to as a detection alert.

If no detections are made, the search command module 118-*a* may return information regarding the area in which the search was conducted and the lack of detections to the user 102. The search command module 118-*a* may also expand or otherwise reconfigure the search in an attempt to locate the missing device 106 at a different time or in a different region. The plan being implemented by the search command module 118-*a* may be transmitted to the user 102 to keep him abreast of the status of the search being undertaken. Various search strategy configurations are further discussed in connection with FIGS. 2 and 3 below.

In some arrangements, the user 102 or search command module 118-*a* may request improved accuracy of results by only including participating search clients 122 that include position modules 130 and/or timing modules 132.

In some alternative embodiments, a database 144 of MAC address locations may be accessible by a search client 122, and the search client 122 may thus report a location to the search command module 118-*a* instead of, or in addition to, a MAC address or other identifying information about the router or client to which the missing device 106 is connected.

In yet other embodiments, a "buddy system" may be implemented, wherein if the search report module 126-*a* is unable to connect to the search command module 118-*a* but is able to connect to another client, the search report module 126-*a* may connect to the search network 120 to send a report of results to another client having connection to the search command module 118-*a*, which may then forward that information to the search command module 118-*a* on behalf of the originating client. The peer computer's location or MAC address may be used as the geo location of the distressed or missing device.

In yet other embodiments, a search client 122 may periodically monitor for devices that are registered to users 102. If a device is detected by a search client 122 in an unexpected location, the system may flag that device as potentially being a missing device 106 and send an alert or contact to the user 102 to determine whether the device is missing or not. This may preemptively assist users in detecting missing devices. For example, if a device of a user based in the United States is detected by a search client 122 in the United Kingdom, the device 106 may have been stolen, so the system 100 may attempt to contact the user 102 to confirm its status.

Figure 2:
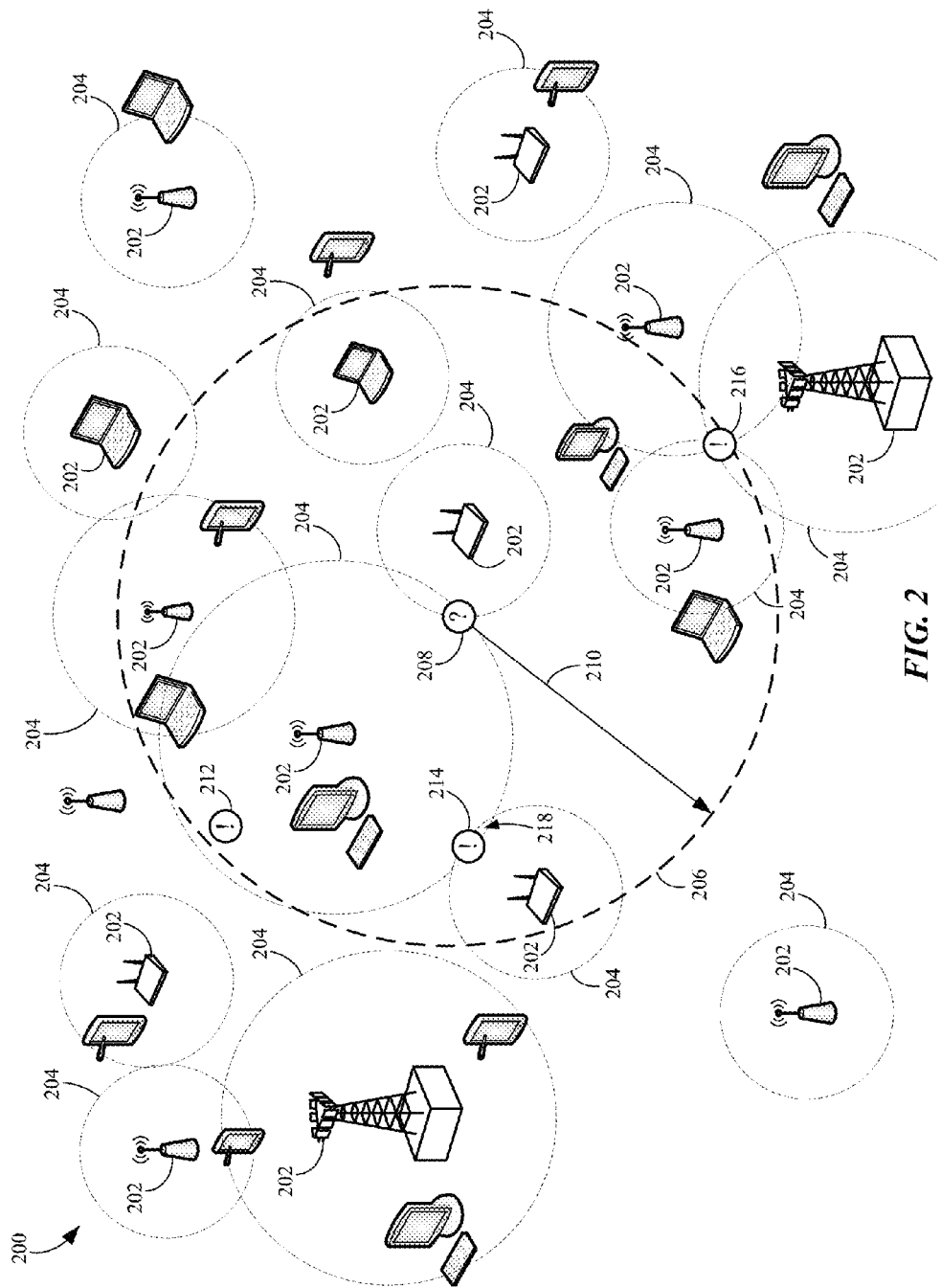
FIG. 2 is a diagram showing a system for community-based detection of a missing device.

FIG. 2 is a diagram showing a system 200 for community-based detection of a missing device. The system 200 may comprise a search network 120 including various search clients 202. The search clients 202 may comprise search clients 122 of FIG. 1. The search clients 202 may comprise personal computers, routers, wireless access points, base stations, and other network nodes. Many other devices may not be search clients 202 (as shown) and may or may not be connected to devices that are search clients 202.

The search clients 202 shown here each include a dashed-lined circle 204 representing their area of influence or an area in which the search client 202 may detect a missing device. These areas 204 may represent the extent of the wired or wireless networks (e.g., networks 134, 142) to which the search clients 202 are connected and able to discover identifiable information about devices on the networks. Some areas 204 overlap, indicating that a device may be connected to both networks simultaneously or may be connected to either network individually in the same location.

When a device (e.g., missing device 106) is reported missing, a search may be performed using the search clients 202. In some embodiments, the search clients 202 are all activated and search for identifying information about the missing device on their individual networks 204. In other embodiments, the search clients 202 within a specified geographical search area 206 are sent instructions to perform a search for the missing device. The search area 206 may be based on a last reported location 208 of the missing device. The extent of the search area 206 may be a geographical radius 210 defined by the reasonable distance that the missing device may have traveled from the time that the device was lost to the time that the search is triggered, or a greater area, if desired. The specified geographical area 206 is indicated as a large dashed circle in this figure, but may be configured as another mathematical shape (e.g., a square or ellipse) or may have a shape defined by the geographical area around the last reported location 208 of the missing device, such as a shape having contours related to the speed at which the device could have been relocated away from the reported location 208. For example, the search area 206 may extend farther from the last reported location 208 along high speed highways, from airports, or away from train stations in comparison to directions that would only be reasonably traversed by a thief on foot or on a bicycle.

After a packet is issued from a server (e.g., search server 112) to search clients 202 in the search area 206, the search clients 202 may use search report modules (e.g., search report modules 126-*a*) and other components to detect identification information for the missing device or to report their status for other reasons to the server. One search client 202 may detect missing device information 212 in the network. Multiple search clients 202 may also detect missing device information simultaneously as shown by alert indicators 214 and 216, which are detected by two and three clients 202, respectively. Upon detection of the missing device by one client 202, the server may locate the client 202 that detected the missing device and provide an estimated area in which the device is likely to be located based on the radius of network influence 204 of the client 202. Upon simultaneous detection of the missing device by multiple clients 202, the server may further narrow down the estimated location of the device based on a network area where the networks overlap in influence (e.g., area 218). The server may triangulate the position of the missing device when it is detected in sufficient networks 204.

In embodiments using a limited search area 206, the clients 202 outside the search area 206 may not be issued instructions by the server, thereby decreasing the overall server load and localizing search resources in an area in which the device is most likely to be located. In these embodiments, the search area 206 may be adjusted under certain circumstances, such as those described in connection with FIG. 3.

Figure 3:
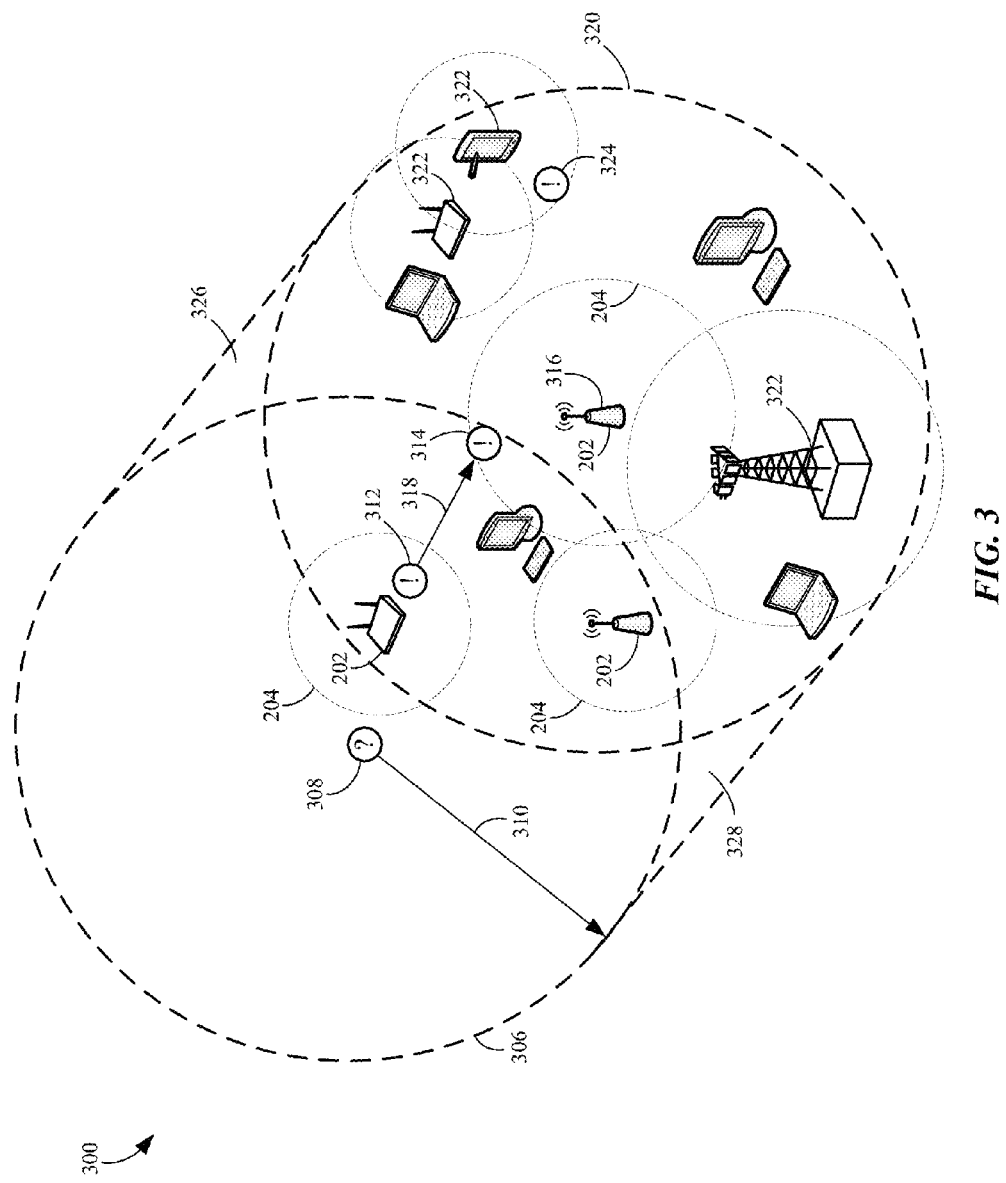
FIG. 3 is another diagram showing a system for community-based detection of a missing device.

FIG. 3 is another diagram showing a system 300 for community-based detection of a missing device. The system 300 is similar to the system 200 of FIG. 2, but simplified to show elements relating to changing aspects of the search area 206. In system 300, the search area 306 may be defined by a radius 310 around a last known location 308 of the missing device. Clients 202 within the search area 306 may have networks 204 extending to areas covered by the search area 306. The search area 306 at this point may be the circle defined by indicator 306. The missing device may be detected within range of one of the networks 204, e.g., at point 312. Thus, the server may establish a general location of the missing device near the client 202 that detected the missing device at point 312. As time goes by, the missing device may then be detected at point 314. The detection of the missing device in range of client 316 may indicate that the missing device is moving (e.g., as indicated by arrow 318. The device may be detected as moving outside or toward the outer reaches of the search area 306. Thus, the search area may be reconfigured to be centered around the last known location of the missing device. In this example, the new search area 320 would be centered around client 316, since that is the last known point from which the position of the missing device may be estimated. Thus, new or additional clients 322 may be issued instructions/packets to search for the missing device. Due to the relocation of the search area to area 320, the missing device may be located at a new point 324 outside the original search area 306. In some embodiments, the expansion of the search area 306 may also include areas between the original search area 306 and new search area 320, such as areas 326, 328. Search areas may be added to each other, or may cancel out areas in which the search has already been performed. For example, when new search area 320 is defined, the clients 202 of search area 306 that are not within area 320 may be configured to stop searching.

Figure 4A:
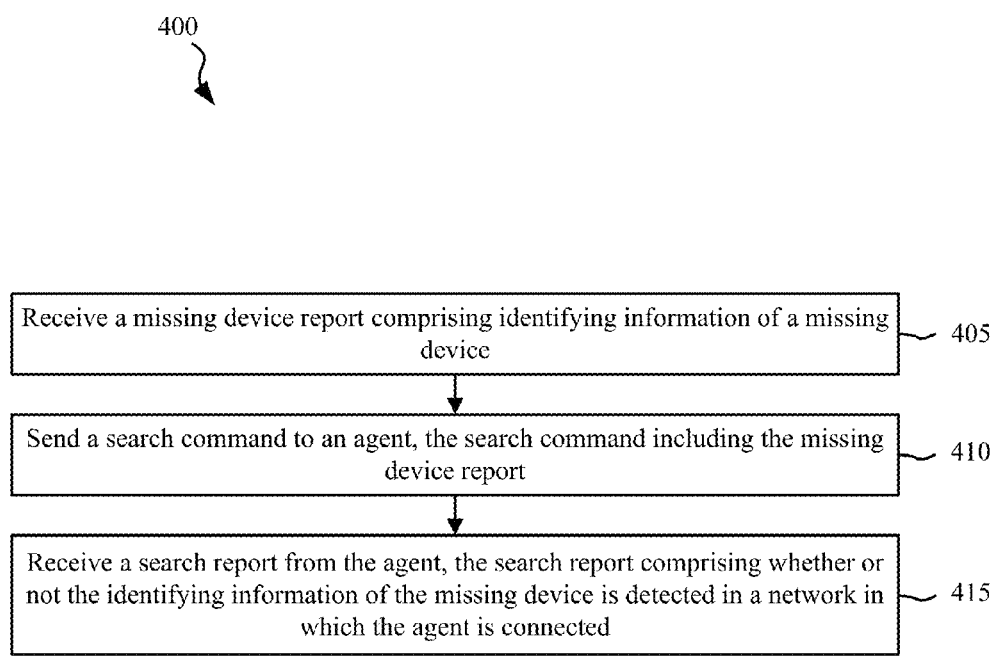
FIG. 4A is a flowchart of a process by which an exemplary embodiment of the present disclosure may be implemented.

FIG. 4A is a flowchart of a process 400 by which an exemplary embodiment of the present disclosure may be implemented. The process 400 may be performed by a computing device, such as, for example, the search server 112 or search client 122 of FIG. 1. The process 400 may be implemented as part of instructions executed by or stored by a search command module (e.g., search command modules 118-a through 118-f) of the present disclosure.

In block 405, the computing device receives a missing device report comprising identifying information of a missing device. The missing device report may come from a device reporting module 110 or may be provided directly to the computing device (e.g., via a user interface such as keyboard 822 of FIG. 8 or another input device). The missing device report may contain identifying information such as a MAC address, device name, or other information, as set forth in greater detail in connection with other figures herein. The missing device may be missing device 106.

At block 410, the computing device sends a search command to an agent. The search command may include the missing device report. The search command may be encrypted. The agent may be a search client 122, 202, 322 as set forth above. The missing device report may include at least a portion of the identifying information of the missing device. For example, a MAC address of the missing device may be hashed, or only a portion of the MAC address that is necessary to identify the missing device may be included in the missing device report. The search command may be issued to many agents or a single agent. The agents to which the search command is issued may be dependent upon an estimated location of the missing device, such as being based on a search area such as search areas 206, 306, and 320. The computing device may wait for a response from the agent after sending the search command.

At block 415, the computing device may receive a search report from the agent. The search report may comprise whether or not the identifying information of the missing device is detected in a network in which the agent is connected. The search report may include information such as the information about the missing device that was detected by the agent prior to sending the search report. The search report may also include information about the agent, such as its current physical location, its location in a network, the estimated range of its connected device detection capability (e.g., the range of a router to which the agent is connected), the time of detection of the identifying information, the name or type of network to which the agent and missing device are connected (e.g., whether it was a cellular network or Wi-fi network), and any other collected information that may lead to recovery of the missing device. In some embodiments, the search report may comprise an indication from the agent that the agent has not detected the missing device or any information identifying the missing device within the scope of its network. Negative reports may be beneficial to assist in determining whether the missing device has been in an area or not. The results of block 415 may be analyzed, stored (e.g., in database 144), or reported to a user (e.g., via a device reporting module 110).

Figure 4B:
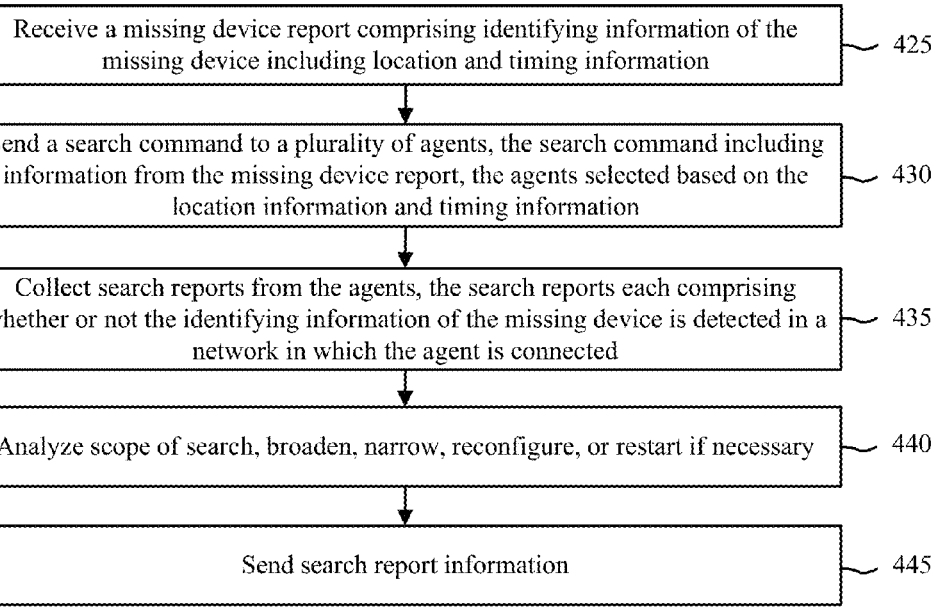
FIG. 4B is a flowchart of a process by which another exemplary embodiment of the present disclosure may be implemented.

FIG. 4B is a flowchart of a process 420 by which an exemplary embodiment of the present disclosure may be implemented. The process 420 may be performed by a computing device, such as, for example, the search server 112 or a search client 122 of FIG. 1. The process 420 may be implemented as part of instructions executed by or stored by a search command module (e.g., search command modules 118-a through 118-f) of the present disclosure. The process 420 may be implemented in parallel or in place of process 400.

In block 425, the computing device receives a missing device report comprising identifying information of the missing device including location and timing information. The performance of block 425 may include actions and elements of block 405 discussed above. The identifying information may include location information (e.g., the last known location of the missing device, the location of the user's residence, location of a suspected thief's residence, or the like) and timing information (e.g., the time of last known location of the missing device or the time elapsed since the time of loss). The identifying information may be provided from a user (e.g., user 102) or may be provided by an automated system (e.g., a system automatically detecting an anomalous location of a suspected missing device).

In block 430, the computing device may send a search command to a plurality of agents. The search command may include information from the missing device report, including, for example, the location and timing information described above. In some embodiments, the location and timing information is not sent, but the agents to which the search command is sent are based on the location and timing information. For example, the computing device may send the search command to agents within a predetermined distance from the last known location of the missing device, wherein the distance is determined based on the time since the time of loss, as discussed in connection with FIGS. 2 and 3 above. The search command may include a script and identifying information about the missing device. The script may cause an agent to perform a search routine to determine whether the missing device has recently connected or is currently connected to a network to which the agent has access.

In one example embodiment, the script may include instructions to run a ping command and sweep through participating computers' IP address range. The ping command may fill an arp cache if a response is received from a pinged IP address. The arp cache may contain mapping of IP and MAC addresses of computers that have responded to the command. The arp command may result in finding a match for the provided missing device's MAC address from a central server. On Microsoft Windows® systems, the arp command may be "arp -a". If the agent is a router, the script may include instructions to scan DNS entries, a DHCP table, and network traffic for identifying information about the missing device. The script may also include instructions to report back to the computing device of process 420, such as, for example, by sending a packet of response information to the computing device. The packet may include an IP address, MAC address, name of the device, and/or a response time to the ping command. These elements of the packet may identify the missing device and/or the agent itself.

In block 435, the computing device may collect search reports from the agents. The search reports may comprise whether or not the identifying information of the missing device was detected in a network to which the agent is connected, similar to block 415 above. The search reports may include the packet of information described in connection with block 430. Collecting the search reports may entail storing the search reports, reading their content, and categorizing the search reports.

In block 440, the computing device may analyze the scope of the search and reconfigure or restart the search if necessary. In analyzing the scope of the search, the computing device may determine whether the missing device was detected in the search by any of the agents, and determine a likelihood that the missing device will still be found in the area of the agent detecting the device. For example, the computing device may determine that the search broadly detected the device in two points, but that the device is moving outside the range of the search or that the device would therefore not be anticipated to be found near the location of the last agent to detect the device. For example, the computing device may follow the search modification procedures and methods described in connection with FIGS. 2 and 3, supra. If it appears that the missing device has not been detected or is unlikely to be found at a point of detection in the search, the computing device may broaden, narrow, reconfigure, or restart the search. In some embodiments, this may require the computing module to activate new or different agents to search for the missing device in block 430. The computing device may also determine to change the type of connectivity tested, such as by sending a search command to cellular network agents instead of only to Wi-fi network agents. This may be beneficial in recovering the missing device if it appears that the device may be leaving an area that has high Wi-fi saturation and into an area with only cellular reception. Similarly, if the device appears to have entered the range of an airport, the scope of the search may be changed to include areas to which flights from the airport in the intervening time have departed. Additional search plan modifications may be apparent in view of this disclosure to those having skill in the art.

In block 445, the computing device sends search report information. This block may be performed at the conclusion of the search, when a missing device is expected to be found where the computing device has located it, or may be performed continuously to give a user an idea of the current status of the search for the missing device. The information sent may comprise the current status of the search (e.g., found/not found or detected/not detected), information from the missing device report, an indication (e.g., map or list) of the scope of the search being conducted and/or locations of agents that have detected the missing device, whether or not the missing device appears to have a different device name (e.g., when the device has been reformatted to have a different device name but the MAC address remains the same), the anticipated range from the detecting agents that the missing device was most likely to be located, and other similar information of interest to a user searching for the missing device. The information sent to the user may be sent via electronic communications, such as, for example, an email, a posting on a website, text message (e.g., short message service (SMS) or multimedia message service (MMS)), phone call, or other medium of correspondence. Preferably, multiple means of contacting the user are used to increase awareness and reduce response times from the user once the device appears to have been located. In block 445, the user may refer to user 102, the device reporting module 110, or the reporting client 104. A user may also include an administrator of the computing device performing the process 420 and law enforcement or other security officers. Sending search report information may be referred to as producing a detection alert identifying an agent detecting the identifying information of the missing device.

Figure 5:
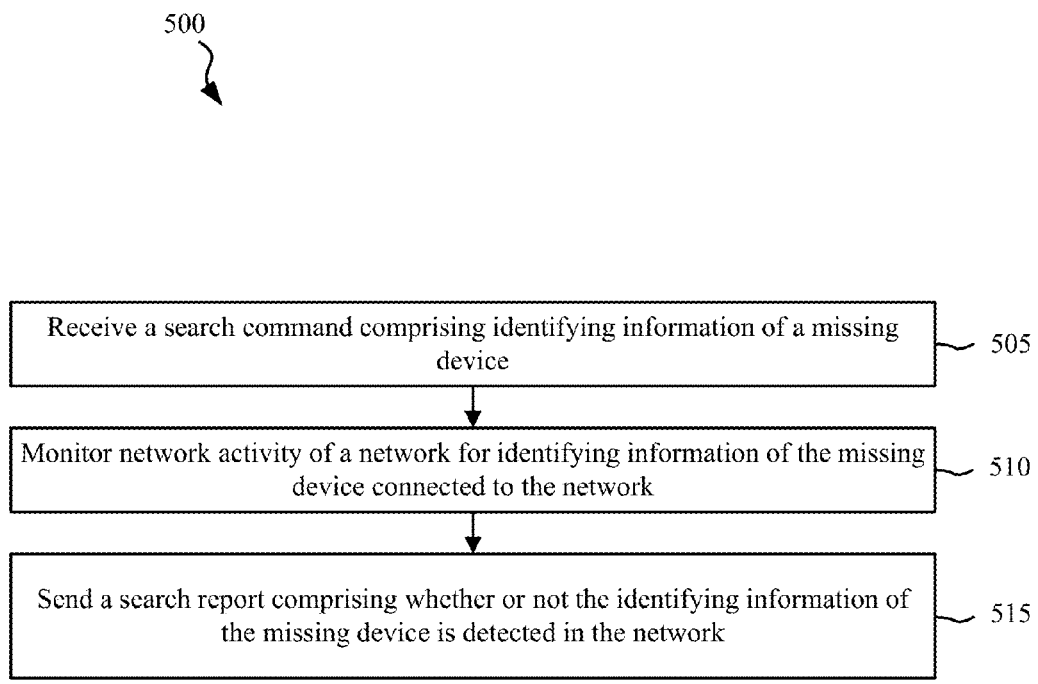
FIG. 5 is a flowchart of a process by which another exemplary embodiment of the present disclosure may be implemented.

FIG. 5 is a flowchart of a process 500 by which an exemplary embodiment of the present disclosure may be implemented. The process 500 may be performed by a computing device, such as, for example, a search client 122, 202, or 322 of FIGS. 1-3. The process 500 may be implemented as part of instructions executed by or stored by a search report module (e.g., search report modules 126-*a* through 118-*d*) of the present disclosure.

In block 505, the computing module may receive a search command comprising identifying information of a missing device. The search command may be a search command sent from a computing device in blocks 410 or 430 of FIGS. 4A-4B. The search command may comprise at least a portion of the identifying information of the missing device from a missing device report. The search command may be encrypted. For example, a MAC address of the missing device may be hashed, or only a portion of the MAC address that is necessary to identify the missing device may be included in the search command. In receiving the search command, the computing device may decrypt the identifying information. The search command may also comprise a script to be executed by the computing device, such as the script described in connection with block 430 above.

In block 510, the computing device may monitor network activity of a network for identifying information of the missing device connected to the network. This may be part of the instructions in the script of block 505. The network monitored may be a communications network to which the computing device may be connected, such as, for example, a wireless or wired network (e.g., a Wi-fi network or telecommunications network). Monitoring network activity may include searching for identifying information of the missing device on one or more networks to which the computing device has access. Monitoring network activity may comprise executing script instructions. In some embodiments, monitoring network activity may comprise executing the script instructions described in connection with block 430 above (e.g., ping and/or arp commands). In some embodiments, the computing device may connect to another device (e.g., a computer connecting to its network router) to monitor network activity and obtain information about devices connected to the network. Upon detection of identifying information of the missing device in the network activity, the information may be recorded. In some embodiments, the information may be stored along with a time to respond to a ping command, a time of detection of the information, a geographic location of the computing device at the time of detection, and other information that may be relevant to determining the location of the missing device and the time that it was detected. The monitoring of network activity may be persistent or periodic, depending on the search command and/or software installed on the computing device.

In block 515, the computing device sends a search report comprising whether or not the identifying information of the missing device is detected in the network. The search report may be sent to the source of the search command received in block 505. For example, the search report may be sent from a search client 122 to a search server 112 via a search network 120. The search report may include information read or stored while in the execution of block 510, such as, for example, identifying information of the missing device in the network activity, the information may be recorded. In some embodiments, the information may be stored along with a time taken to respond to a ping command, a time of detection of the information, a geographic location of the computing device at the time of detection, and other information that may be relevant to determining the location of the missing device and the time that it was detected. The search report may be sent immediately upon detection of a device, upon a schedule, or upon detection of predetermined conditions. For example, when various networks detect the device simultaneously the search report may be set to be sent only in response to detection of the missing device by a network that is smaller than a predetermined size (e.g., that reaches 100-200 feet) to narrow down the area of the search for the missing device. This may be beneficial when some devices have a very broad range of detection (e.g., cellular base stations) and the detection of the missing device information is relatively inefficient in determining the location of the device within its area of network coverage.

Thus, process 500 may be beneficial in executing a search for the missing device and sending search results to a search command-issuing computing device.

Figure 6:
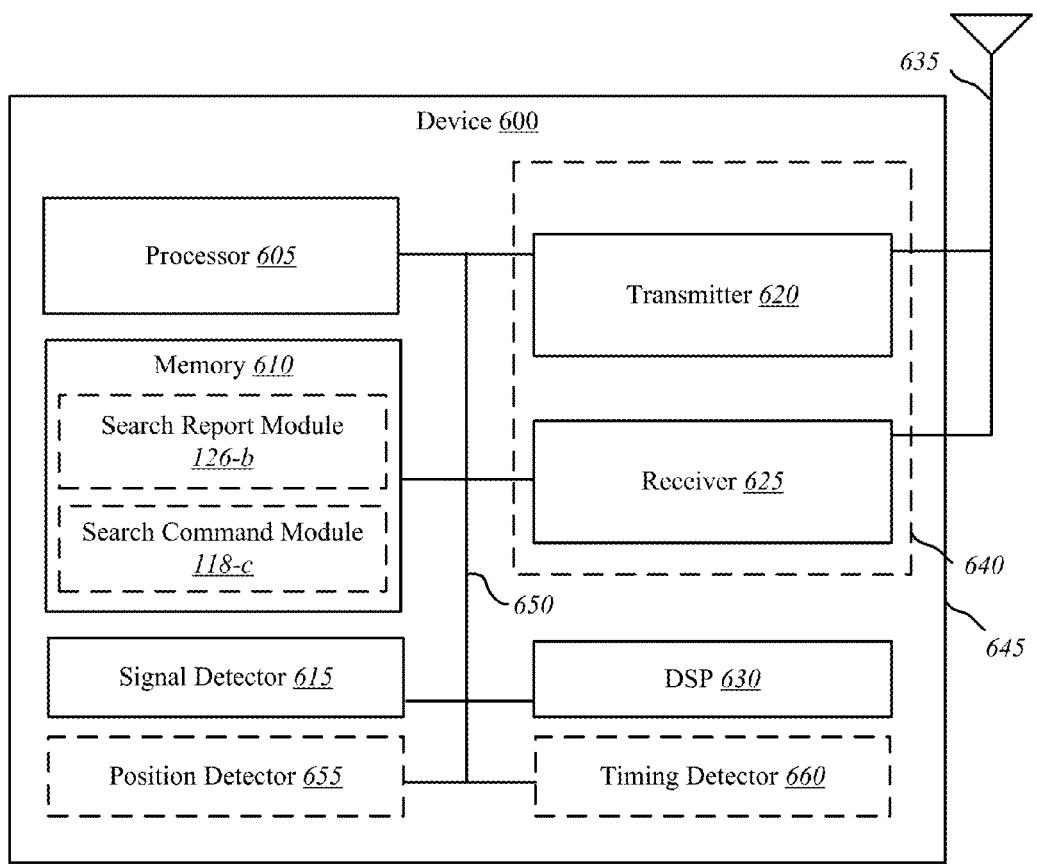
FIG. 6 is a block diagram of a device which may be used to implement various embodiments of the present systems and methods.

FIG. 6 is a block diagram of a device 600 which may be used to implement various embodiments of the present systems and methods. The device 600 may be a mobile computing device, such as, for example, a smartphone, tablet, laptop computer, or other portable device capable of wireless communications. The device 600 may comprise a processor 605, memory 610, signal detector 615, transmitter 620, receiver 625, and digital signal processor (DSP) 630 all linked by a common bus 650. The transmitter 620 and receiver 625 may collectively comprise a transceiver 640. The device may include a housing 645 for these components. An antenna 635 may be connected to the transceiver 640 components, and may be external or internal to the housing 645. In some embodiments, the bus may also be connected to a position detector 655 and a timing detector 660. Installation and configuration of a search report module 126-*b* and/or search command module 118-*c* on mobile computing devices may beneficially increase the number of potential points of contact between devices having these modules and a missing device. Furthermore, because many mobile computing devices have accurate position detectors 655 (e.g., GPS), a detection of a missing device by a mobile computing device may be able to pinpoint the position of the missing device more quickly and accurately than other devices (e.g., laptops) that are not as frequently configured with accurate position detectors 655 in many cases.

The memory 610 may comprise and/or store one or both of a search report module 126-*b* and a search command module 118-*c*. For this reason, the device 600 may act as a search client 122. The transceiver 640 and antenna 635 may be used to connect to a wireless network to which the device 600 is connected to search for the missing device (e.g., as described in connection with FIG. 5, supra). The device 600 may also use search command module 118-*c* to issue search commands to other devices or search clients (e.g., as described in connection with FIGS. 4A and 4B, supra).

The position detector 655 may comprise a device or software module on the device 600 configured to determine the position of the device. In some embodiments, the position detector 655 may access the transceiver 640 and antenna 635 to detect the position of the device 600 relative to other devices, antennas, satellites, and other location positioning equipment. For example, the position detector 655 may use wireless signals received by the antenna to triangulate the position of the device 600. In some embodiments, the position detector 655 uses its own signal receptor, such as by using a global positioning system (GPS) receiver. The search report module 126-*b* may access the position detector 655 or the output of the position detector 655 to create and send a search report.

The timing detector 660 may comprise a device or software module on the device 600 configured to determine timing of the exchange of signals to and from the device 600. The timing detector 660 may therefore be used to time the receipt and sending of search commands and search reports from the search report module 126-*b* and/or search command module 118-*c*. Additionally, the timing detector 660 may be used to track the latency of ping commands or other signals sent by the device 600 while searching for a missing device. In some embodiments, the functions of the timing detector 660 may be performed by the processor 605.

Figure 7:
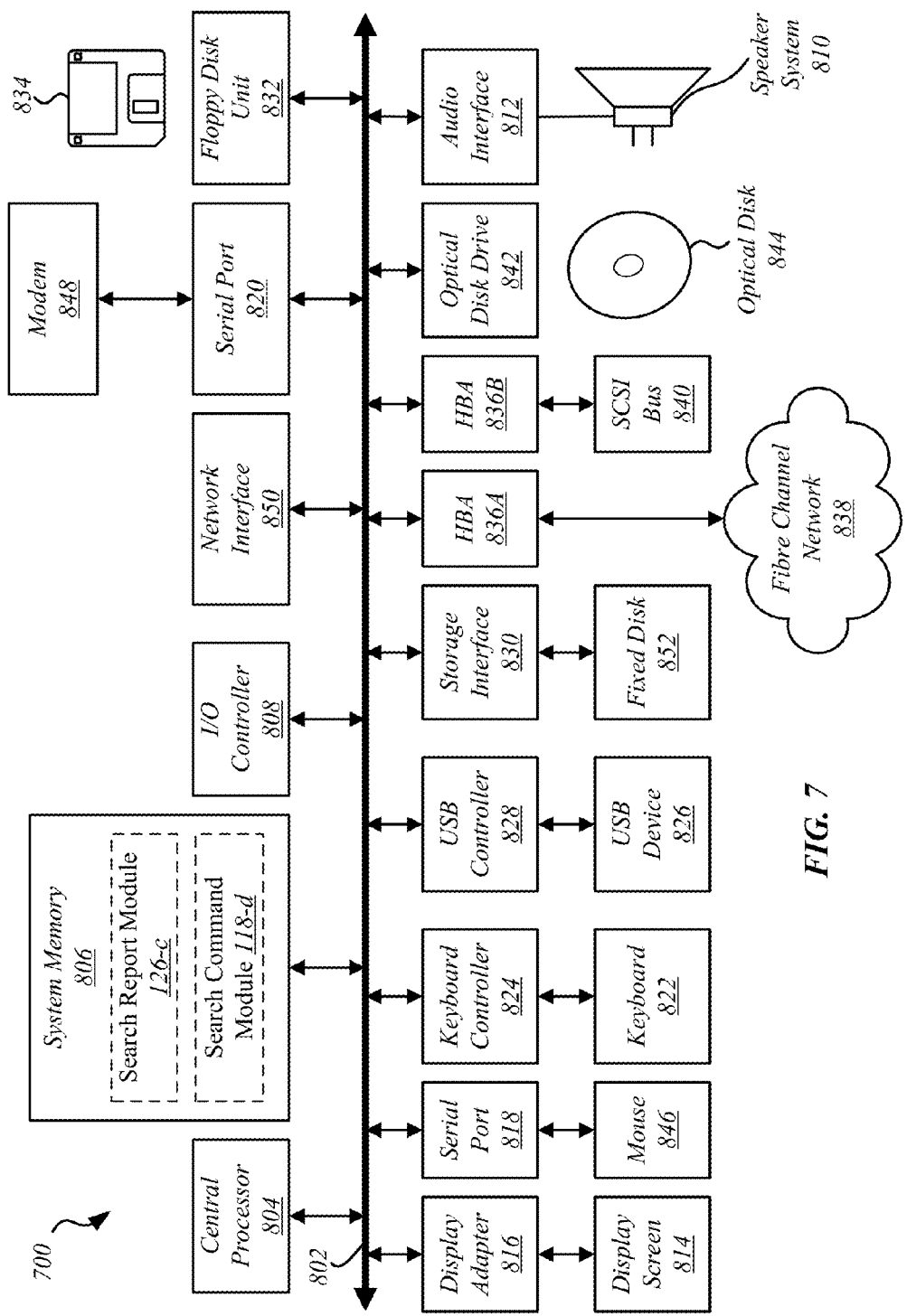
FIG. 7 depicts a block diagram of a computer system suitable for implementing the present systems and methods.

FIG. 7 depicts a block diagram of a computer system 700 suitable for implementing the present systems and methods. Computer system 700 includes a bus 702 which interconnects major subsystems of computer system 700, such as a central processor 704, a system memory 706 (typically RAM, but which may also include ROM, flash RAM, or the like), an input/output controller 708, an external audio device, such as a speaker system 710 via an audio output interface 712, an external device, such as a display screen 714 via display adapter 716, serial ports 718 and 720, a keyboard 722 (interfaced with a keyboard controller 724), multiple universal serial bus (USB) devices 726 (interfaced with a USB controller 728), a storage interface 730, a floppy disk unit 732 operative to receive a floppy disk 734, a host bus adapter (HBA) interface card 736A operative to connect with a Fibre Channel network 738, a host bus adapter (HBA) interface card 736B operative to connect to a small computer system interface (SCSI) bus 740, and an optical disk drive 742 operative to receive an optical disk 744. Also included are a mouse 746 (or other point-and-click device, coupled to bus 702 via serial port 718), a modem 748 (coupled to bus 702 via serial port 720), and a network interface 750 (coupled directly to bus 702).

Bus 702 allows data communication between central processor 704 and system memory 706, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the search command module 118-$d$ or search report module 126-$c$ may implement the present systems and methods may be stored within the system memory 706. Applications resident with computer system 700 are generally stored on and accessed via a non-transitory computer readable medium, such as a hard disk drive (e.g., fixed disk 752), an optical drive (e.g., optical drive 742), a floppy disk unit 732, or other storage medium. Additionally, applications can be in the form of electronic signals modulated in accordance with the application and data communication technology when accessed via network modem 748 or interface 750.

Storage interface 730, as with the other storage interfaces of computer system 700, can connect to a standard computer readable medium for storage and/or retrieval of information, such as a fixed disk drive 752. Fixed disk drive 752 may be a part of computer system 700 or may be separate and accessed through other interface systems. Modem 748 may provide a direct connection to a remote server via a telephone link or to the Internet via an internet service provider (ISP). Network interface 750 may provide a direct connection to a remote server via a direct network link to the Internet via a POP (point of presence). Network interface 750 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 706, fixed disk 752, optical disk 744, or floppy disk 734. The operating system provided on computer system 700 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
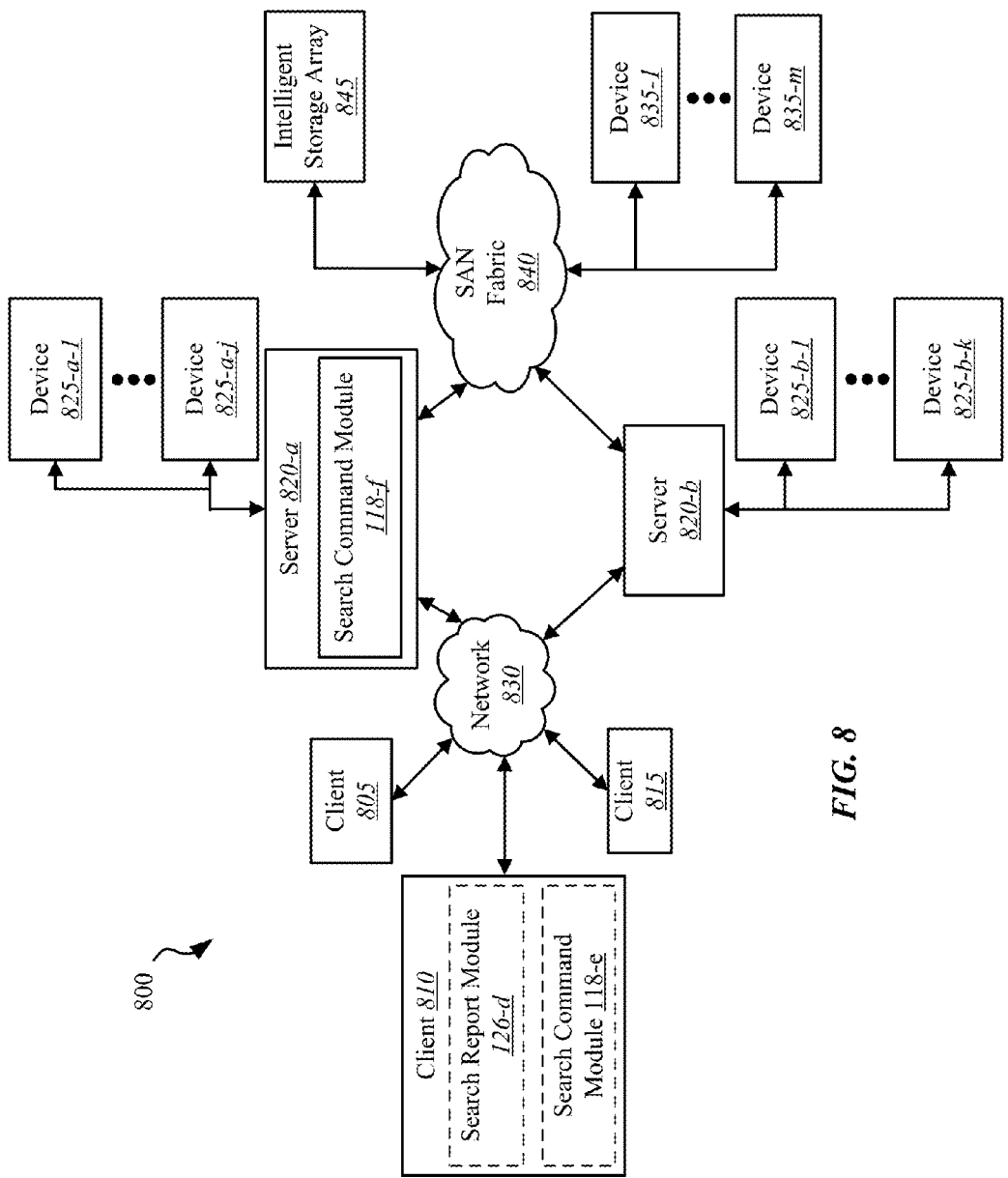
FIG. 8 is a block diagram depicting a network architecture in which client systems, as well as storage servers (any of which can be implemented using computer system), are coupled to a network.

FIG. 8 is a block diagram depicting a network architecture 800 in which client systems 805, 810 and 815, as well as storage servers 820-$a$, 820-$b$ (any of which can be implemented using computer system 700), are coupled to a network 830. Client systems (e.g., client 810) may include a search report module 126-$d$ or search command module 118-$e$. In one embodiment, a search command module 118-$f$ may be located within the storage servers 820-$a$, 820-$b$ to implement the present systems and methods. The storage server 820-$a$ is further depicted as having storage devices 825-$a$-1 through -j directly attached, and storage server 820-$b$ is depicted with storage devices 825-$b$-1 through -k directly attached. Storage area network (SAN) fabric 840 supports access to storage devices 835-1 through -m by storage servers 820-$a$, 820-$b$, and so by client systems 805, 810 and 815 via network 830. Intelligent storage array 845 is also shown as an example of a specific storage device accessible via SAN fabric 840.

With reference to computer system 700, network interface 785 or some other method can be used to provide connectivity from each of client computer systems 805, 810, and 815 to network 830. Client systems 805, 810 and 815 are able to access information on storage server 820-$a$ or 820-$b$ using, for example, a web browser or other client software (not shown). Such a client allows client systems 805, 810, and 815 to access data hosted by storage server 820-$a$ or 820-$b$ or one of storage devices 825-$a$-1 through -j, 825-$b$-1 through -k, 835-1 through -m or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of community-based detection of a missing device, the method comprising:
    initiating, via a processor, a search for the missing device upon receiving a missing device report, the missing device report comprising identifying information and location information of the missing device;
    identifying, via the processor, a first set of one or more agents for the search based at least in part on the location information of the missing device;
    sending, via the processor, a search command to the identified first set of one or more agents, the search command including the missing device report;
    identifying at least one agent within a geographic region based on a difference between a time associated with the missing device report and a time of sending the search command, wherein the at least one agent is among the first set of one or more agents;
    receiving, via the processor, a search report from the first set of one or more agents, the search report comprising whether or not the identifying information of the missing device is detected in a network in which at least one of the first set of one or more agents are connected;
    estimating, via the processor, a direction of travel of the missing device based at least in part on the search report;
    identifying, via the processor, a second set of one or more agents for the search based at least in part on the estimated direction of travel of the missing device; and
    sending, via the processor, an update search command to the identified second set of one or more agents.

2. The method of claim 1, wherein the identifying information comprises permanent identifying information of the missing device.

3. The method of claim 2, wherein the permanent identifying information comprises multiple pieces of data.

4. The method of claim 1, wherein the identifying information includes timing information of the missing device, the timing information comprising at least an estimated time of loss of the missing device.

5. The method of claim 1, wherein the search report comprises a geographic location of the one or more agents.

6. The method of claim 5, further comprising:
    producing a detection alert, the detection alert identifying the geographic location of an agent detecting the identifying information of the missing device.

7. The method of claim 1, wherein the search command is sent to a plurality of agents and a plurality of search reports are received from the plurality of agents.

8. The method of claim 7, wherein each of the plurality of search reports comprises a geographic location of the agents sending the search reports and a time of detection of the identifying information of the missing device, and the method further comprises:
    estimating a location of the missing device based on the geographic locations of the agents and the times of detection of the identifying information of the missing device.

9. A method of community-based detection of a missing device, the method comprising:
    receiving, via a processor of a client device, a search command based on a search for the missing device being initiated, the search command comprising identifying information and location information of the missing device, the search command being received by the client based at least in part on the location information of the missing device and a location of the client device, wherein the client is among a first set of one or more clients selected to receive the search command;
    wherein the client device is identified within a geographic region based on a difference between a time associated with the missing device report and a time of the search command being sent;
    monitoring, via the processor, network activity of a network for the identifying information of the missing device connected to the network based on the search command;
    sending, via the processor, a search report to a remote device, the search report comprising whether or not the identifying information of the missing device is detected in the network by the client device, wherein the search report comprises a geographic location;
    receiving, via the processor, a modified search command from the remote device, the modified search command being based on the remote device estimating of a direction of travel of the missing device based on the search report and identifying a second set of one or more clients, wherein the client is among the second set of one or more clients selected to receive the modified search command; and
    monitoring, via the processor, network activity of the network for the identifying information of the missing device connected to the network based on the modified search command.

10. The method of claim 9, wherein the identifying information comprises permanent identifying information of the missing device.

11. The method of claim 9, wherein monitoring network activity of the network comprises accessing a network device, the network device receiving identifying information of the missing device.

12. The method of claim 9, wherein monitoring network activity of the network comprises searching for the identifying information in at least one of: a connected IP range of the network, a network domain, a parent network domain, a DHCP client table of the network, DNS entries of the network, or network traffic of the network.

13. The method of claim 9, wherein the search report further comprises identifying information of all devices encountered on the network.

14. A computing device configured to detect a missing device using community-based networking, the computing device comprising:
- a processor;
- a memory in electronic communication with the processor, the memory storing instructions that, when executed by the processor, cause the computing device to:
- initiate a search for the missing device upon receiving a missing device report, the missing device report comprising identifying information and location information of the missing device;
- identify a first set of one or more agents for the search based at least in part on the location information of the missing device;
- send a search command to the identified a first set of one or more agents, the search command including the missing device report; and
- identify at least one agent within a geographic region based on a difference between a time associated with the missing device report and a time of sending the search command, wherein the at least one agent is among the first set of one or more agents;
- receive a search report from the a first set of one or more agents, the search report comprising whether or not the identifying information of the missing device is detected in a network in which the a first set of one or more agents are connected;
- estimate a direction of travel of the missing device based at least in part on the search report;
- identify a second set of one or more agents for the search based at least in part on the estimated direction of travel of the missing device; and
- send an update search command to the identified second set of one or more agents.

15. The computing device of claim 14, wherein the computing device receives a plurality of search reports and a plurality of geographic locations, wherein the instructions further cause the computing device to:
- estimate a location of the missing device based on the plurality of geographic locations.

* * * * *